United States Patent
Bura et al.

(10) Patent No.: US 12,445,035 B2
(45) Date of Patent: *Oct. 14, 2025

(54) METHOD AND APPARATUS FOR ASCERTAINING A PARAMETER, SAID PARAMETER CHARACTERIZING A CURRENT OR A VOLTAGE IN A CIRCUIT ARRANGEMENT

(71) Applicant: Robert Bosch GmbH, Stuttgart (DE)

(72) Inventors: Dennis Bura, Renningen (DE); Markus Michels, Stuttgart (DE); Michael Jiptner, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 303 days.

This patent is subject to a terminal disclaimer.

(21) Appl. No.: 18/041,920

(22) PCT Filed: Jul. 20, 2021

(86) PCT No.: PCT/EP2021/070222
§ 371 (c)(1),
(2) Date: Feb. 16, 2023

(87) PCT Pub. No.: WO2022/037876
PCT Pub. Date: Feb. 24, 2022

(65) Prior Publication Data
US 2023/0327537 A1    Oct. 12, 2023

(30) Foreign Application Priority Data

Aug. 20, 2020    (DE) .................. 10 2020 210 577.4

(51) Int. Cl.
*H02M 1/00*    (2007.01)
*H02M 1/08*    (2006.01)
*H02M 3/156*   (2006.01)

(52) U.S. Cl.
CPC ....... *H02M 1/0058* (2021.05); *H02M 1/0009* (2021.05); *H02M 1/083* (2013.01); *H02M 3/156* (2013.01)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS 9,973,083 B1 *  5/2018  Rose ............... H02M 1/08
10,057,950 B2 *  8/2018  Lochmann .......... H05B 45/382
(Continued)

FOREIGN PATENT DOCUMENTS

CH          701856 A2    3/2011
JP       2003092877 A    3/2003

OTHER PUBLICATIONS

Translation of International Search Report and Written Opinion for Application No. PCT/EP2021/070222 dated Oct. 22, 2021 (2 pages).

*Primary Examiner* — Jeffrey A Gblende
(74) *Attorney, Agent, or Firm* — Michael Best & Friedrich LLP

(57) ABSTRACT

Disclosed is a method (100) for ascertaining a parameter (I_avg, I_N, I_P, V_c), said parameter (I_avg, I_N, I_P, V_c) characterizes a current or a voltage in a circuit arrangement (200). The circuit arrangement (200) comprises an inductor (L) through which an alternating choke current (I_L) flows. The method comprises the steps of: ascertaining (120) at least one duration (TN1) between two zero crossings (N_−, N_+)+) of the choke current (I_L), or a duration (TNE1) between a zero crossing (N_−, N_+)+) and an apex (E_−, E_+) of the choke current (I_L); ascertaining (130) the parameter (I_avg, I_N, I_P, V_c) according to the ascertained duration (TN1, TNE1).

10 Claims, 3 Drawing Sheets

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069

See application file for complete search history.

(56) References Cited

U.S. PATENT DOCUMENTS

| | | | |
|---|---|---|---|
| 10,181,793 B2* | 1/2019 | Zhang | H02M 1/083 |
| 11,223,236 B2* | 1/2022 | Van Wageningen | H04B 5/72 |
| 2006/0061343 A1 | 3/2006 | Lipcsei et al. | |
| 2009/0309573 A1* | 12/2009 | Lurkens | H02M 3/00 324/76.11 |
| 2021/0028685 A1* | 1/2021 | Shao | H02M 1/088 |

* cited by examiner

METHOD AND APPARATUS FOR ASCERTAINING A PARAMETER, SAID PARAMETER CHARACTERIZING A CURRENT OR A VOLTAGE IN A CIRCUIT ARRANGEMENT

BACKGROUND OF THE INVENTION

The invention relates to a method and to a device for determining a parameter, wherein the parameter characterizes a current or a voltage in a circuit arrangement. Furthermore, the invention relates to a current controller, to a drivetrain having a corresponding device, and to a vehicle having a drivetrain as well as to a computer program and a machine-readable storage medium.

Circuit arrangements for active voltage converters for use in vehicles are known from the prior art. High demands are placed on the power density and the efficiency of the voltage converters. In order to minimize the size of the passive components, in particular the inductors, chokes, or transformers, the voltage converters are operated at high switching frequencies in the range of several hundred kHz. In order to also ensure high efficiency, the switching elements or power semiconductors used in the active voltage converters are switched on softly, which is also called "zero voltage switching" (ZVS). The control of such systems while simultaneously ensuring the ZVS constitutes a great technical challenge. Such control is frequently realized by means of a detection of the zero crossing of the current, also called zero current detection (ZCD), as disclosed for example in the publication CH 701856 A2. These control approaches offer many advantages with regard to their dynamics and stability.

Particularly with regard to the steadily increasing switching frequencies in power electronics, and the associated short period durations, however, decisive disadvantages of the classical ZCD method arise: The direct reaction to a determined or detected zero crossing of the current places very high demands on the control unit of the power electronic system (e.g., a microcontroller or ASIC). This is due to the fact that the reaction to the zero crossing of the current has to occur immediately—that is to say, still within the same switching period. For example, in such methods, the remaining switch-on time (see FIG. 3, S2on+) of the switched-on switch after the zero crossing must be determined. In this case, multiple computation operations and register accesses must be carried out, which must not take longer than a small portion of the period of the switching frequency of the power electronics. What adds to the difficulty is that no time remains for a plausibility check and error correction of the ZCD signal. In addition, many microcontrollers do not provide for a direct, external intervention in the PWM module. Furthermore, the switching frequency is usually not controllable in the classical ZCD method. The classical method also does not constitute any closed-loop control in the actual sense; rather, it is open-loop control.

Therefore, there is a need for control methods for active voltage converters in which there is no need to react directly to a zero crossing of the current.

SUMMARY OF THE INVENTION

A method is proposed for determining a parameter, wherein the parameter characterizes a current or a voltage in a circuit arrangement. The circuit arrangement comprises an inductor, an alternating choke current flowing through the inductor. The method comprises the steps of: determining at least one duration between two zero crossings of the choke current or a duration between a zero crossing and a vertex of the choke current; determining the parameter as a function of the determined duration.

A method is proposed in which a parameter is determined, wherein the parameter characterizes a current or a voltage in a circuit arrangement. The circuit arrangement comprises an inductor. The inductor is preferably a choke or a primary or secondary winding of a transformer, which is preferably used in a DC/DC converter or in a charging device, preferably for the galvanic separation of the input and output. An alternating choke current flows through the inductor. "Alternating" means that the choke current alternately assumes negative and positive values. In order for the choke current to alternate, the inductor is alternately connected to a first potential, preferably a positive potential, and to a second potential, preferably a negative potential, at a first connection of the inductor. This results in a choke current through the inductor, which current alternately rises linearly up to a positive maximum and then decreases linearly down to a negative minimum, and so on. The point in time at which the choke current reaches the positive maximum is referred to in the following as the positive vertex. The point in time at which the choke current reaches the negative minimum is referred to in the following as the negative vertex. The change from linearly rising to linearly falling, or vice versa, occurs during the change of the one-sided connection of the inductor from the first potential to the second potential, or vice versa. During the descent of the choke current from the positive maximum to the negative minimum, the sign of the choke current changes from positive to negative in a so-called, preferably first, zero crossing of the choke current. During the ascent of the choke current from the negative minimum to the positive maximum, the sign of the choke current changes from negative to positive in a, preferably second, zero crossing of the choke current. Preferably, the first terminal of the inductor is connected to the first potential and the second potential by means of a half bridge with two switching elements, wherein a first switching element is connected on one side to the first potential and is connected on the other side to a center tap of the half bridge, and a second switching element is connected on one side to the second potential and is connected on the other side to the center tap of the half bridge, wherein the inductor is connected by the first connection to the center tap. For this purpose, one switching element is preferably switched on alternately while the other is switched off in each case. As such, the point in time of the activation of at least one of the switching elements also corresponds in each case to one of the points in time at which the choke current reaches either the positive maximum or the negative minimum. The inductor is preferably connected to a third potential by a second connection. In order for the first and the second potentials to be different, an input voltage is preferably present between two potentials of the first, second or third potential. The input voltage is preferably an AC voltage or a DC voltage. Preferably, the frequency of the input voltage is very much lower than, preferably at least one order of magnitude less than, the frequency of the alternating choke current. Preferably, an approximately constant voltage is then produced during a period of the alternating choke current. By means of a step of the method, at least one duration between two zero crossings of the choke current, preferably between a first and a subsequent second zero crossing of the choke current, is determined. As such, the duration between a first zero crossing of the choke current is preferably determined in which the sign changes from positive to negative, and an immediately subsequent second zero crossing of the choke current is determined in which the sign changes from negative to positive or vice versa. Alternatively, a duration between a zero crossing and a vertex of the choke current, preferably between a second zero crossing and a positive vertex of the choke current, is determined. As regards formulating the determination of the duration between two zero crossings or a zero crossing and a vertex, a zero crossing is understood as a point in time at which the sign of the alternating choke current changes from positive to negative or vice versa. In a further step of the method, the parameter is determined as a function of the determined duration.

Advantageously, a method is provided which makes it possible to determine a parameter as a function of a time variable which is determined in connection with the zero crossings of a choke current, wherein the parameter characterizes a current or a voltage in a circuit arrangement. No current or voltage sensor is required for this purpose. Instead, the duration between two zero crossings or the duration between the vertex and the zero crossing is advantageously used to preferably determine information such as a mean value or peak values of the choke current or of a voltage within the circuit arrangement. Control or a state estimation is then preferably established based on these newly obtained parameters or measured values. Advantageously, in this method, one or more entire periods can elapse before a reaction by means of the controller or state estimator. Therefore, a plausibility check and error detection of a ZCD signal can preferably be carried out, which increases the quality. Advantageously, a more favorable microcontroller can be used, since more time is available for the required computation operations. On the basis of the information obtained, further controllers can preferably be used for a plurality of variables. Preferably, control of the current reversal points or the switching frequency can also be established independently of the mean value of the choke current. The choke current to be controlled can preferably be detected in a highly dynamic manner (each switching period) by means of this method. Advantageously, the current sensor which would otherwise be necessary can be omitted, or a more favorable sensor with less bandwidth can be used. Advantageously, additional state estimates based on the zero crossing times result in savings potentials for further sensors. Advantageously, the parameter for controlling a voltage converter is preferably used as a feedback variable of a control loop.

In a further embodiment of the invention, the method relates to the determination of a parameter, wherein the parameter characterizes a current through the inductor in the circuit arrangement. The circuit arrangement comprises a half bridge having a first switching element and a second switching element. The first switching element is connected on one side to a first potential and is connected on the other side to a center tap of the half bridge. The second switching element is connected on one side to a second potential and is connected on the other side to a center tap of the half bridge. The inductor is connected to the center tap by a first connection and is connected to a third potential by a second connection. An input voltage is present between the first potential and the third potential. The method comprises the steps of: alternately activating, or switching on and off, the first and the second switching element with a specifiable duty cycle, thereby producing the alternating choke current through the inductor; determining the duration between the zero crossings of the choke current; determining the parameter as a function of the input voltage, the size of the inductor, the duty cycle, and the duration between the zero crossings, preferably a first and a second zero crossing, of the choke current.

Advantageously, a method is provided for a circuit arrangement which makes it possible to determine a parameter as a function of a time variable which is determined in connection with the zero crossings of the choke current, wherein the parameter characterizes a current through the inductor in the circuit arrangement. The parameter to be determined characterizes a current, wherein the current is preferably the input current of the circuit arrangement.

In a further embodiment of the invention, the parameter to be determined is a current mean value of the choke current through the inductor. The alternating activation of the first and the second switching element preferably takes place with a specifiable frequency and the current mean value is in particular determined as a function of the period duration.

A method is provided in which a current mean value of the choke current is advantageously determined as a parameter. This is preferably determined, in addition to the already mentioned variables, as a function of the period duration of the alternating choke current. The parameter to be determined as the current mean value corresponds or preferably correlates with the value of the input current of the circuit arrangement.

In a further embodiment of the invention, the parameter to be determined is a negative or positive peak value of the choke current through the inductor. Preferably, the negative peak value of the choke current corresponds to the negative minimum of the choke current and the positive peak value corresponds to the positive maximum of the choke current.

Advantageously, a method is provided in which negative and/or positive peak values of the choke current are determined as parameters.

In a further embodiment of the invention, the determination of the duration between the zero crossings comprises determining a first point in time of a first zero crossing of the choke current and determining a second point in time of a second zero crossing of the choke current. Preferably, the determination of the duration between the zero crossings comprises determining a first point in time at which the sign of the choke current changes from positive to negative, and the subsequent determination of a second point in time at which the sign of the choke current changes from negative to positive, or vice versa.

Preferably, the points in time of the zero crossings are determined by means of a sensor which detects the zero crossing, preferably by means of a current sensor or by means of an inductively obtained signal.

Advantageously, a method for determining the points in time between the zero crossings is provided.

In a further embodiment of the invention, the duration between the points in time, preferably the first and the subsequent second point in time or the second and the subsequent first point in time, is determined by means of a counter, preferably a microcontroller.

A determination of a duration, to be realized by means of simple technical means, is the use of a counter, preferably a microcontroller. Each microcontroller has a counter which counts up at equidistant time intervals. The elapsed duration can consequently be determined from the difference between the counter states at the second and the first point in time.

Advantageously, a method is provided for determining the duration between the points in time.

Furthermore, the invention relates to a computer program comprising instructions which, when the program is executed by a computer, cause the computer to carry out the described methods or the steps of the method.

Furthermore, the invention relates to a computer-readable storage medium comprising instructions which, when executed by a computer, cause the latter to carry out the described methods or the steps of the method.

Furthermore, the invention relates to a current controller for controlling a choke current through an inductor, having a logic unit and a controller, wherein the logic unit is configured to carry out a described method, wherein the determined parameter is incorporated as a feedback variable of the control by the controller, and the duty cycle is preferably output as a controlled variable, wherein the first and the second switching element are activated as a function of the duty cycle.

A current controller having a logic unit and a controller is provided for controlling a choke current through the inductor, preferably the current mean value through the inductor or the input current of the circuit arrangement. The controller incorporates a parameter determined by means of the described methods as a feedback variable. The duty cycle is preferably output as a controlled variable. However, the switching frequency, or any other pulse pattern, can also be output as a controlled variable, preferably in a method for direct switching.

Advantageously, a current controller is provided which incorporates a parameter determined by means of a duration between zero crossings as a feedback variable. Advantageously, a current sensor can be dispensed with in this control.

Furthermore, the invention relates to a device, in particular a DC/DC converter or a charging device, having an inductor, wherein the inductor is arranged in a circuit arrangement, the device being designed to carry out a described method. The parameter determined in this case is further used as a measured variable within the device, for example in the plausibility check of a determined or calculated, estimated, observed, or measured variable. Or, the determined parameter is transmitted via an interface, preferably by means of a cable, in a contactless manner, by radio, or by an optical waveguide, to outside the device.

A device is provided in which the circuit arrangement is integrated and in which the method is carried out for determining the parameter. The determined parameter is either further used within the device for the operation of the device or is transmitted to the outside for a further use outside, preferably in a further device or a control unit.

Furthermore, the invention relates to a drivetrain having a described device, and in particular having power electronics and/or an electric drive. Such a drivetrain serves, for example, to drive an electric vehicle. The method and the device enable reliable operation of the drivetrain.

The invention further relates to a vehicle having a described drivetrain. Advantageously, a vehicle is thus provided which comprises a described device.

It should be understood that the features, properties and advantages of the method according to the invention apply to or can be used accordingly in the current controller, the device and/or the drivetrain, and the vehicle, and vice versa.

BRIEF DESCRIPTION OF THE DRAWINGS

Further features and advantages of embodiments of the invention will become apparent from the following description with reference to the accompanying drawings.

The invention will be explained in more detail below with reference to several drawings, in which.

DETAILED DESCRIPTION

Figure 1:
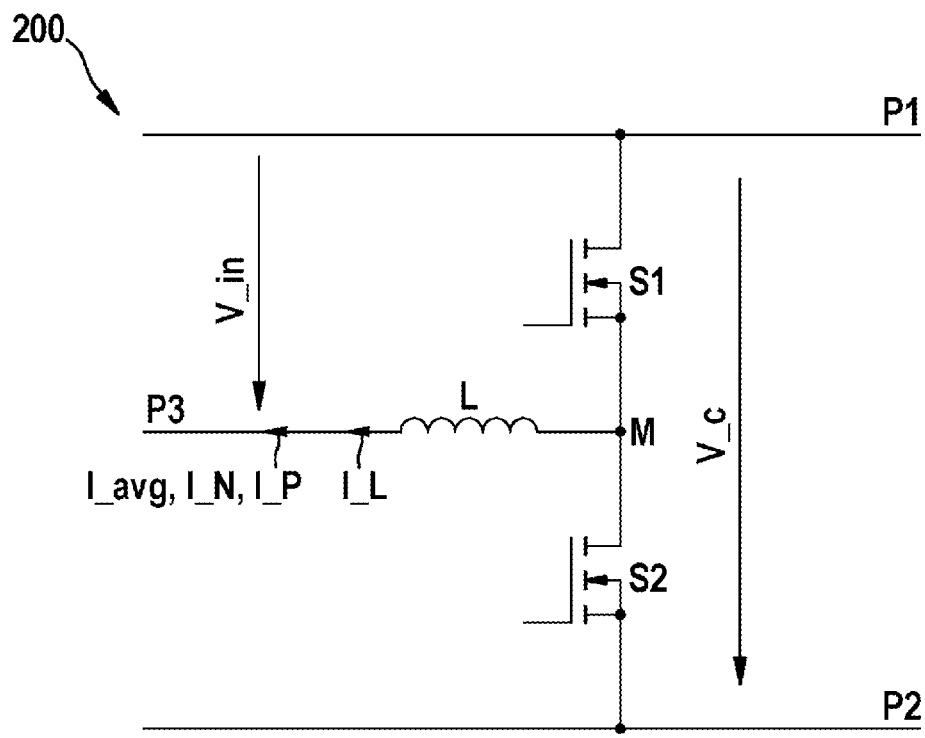
FIG. 1 is a schematic view of a circuit arrangement.

FIG. 1 shows a circuit arrangement 200, wherein the circuit arrangement 200 comprises an inductor L through which an alternating choke current $I\_L$ flows. The inductor is preferably a choke or a primary or secondary winding of a transformer, which is preferably used in a DC/DC converter or in a charging device, preferably for the galvanic separation of the input and output. The high-frequency alternating choke current $I\_L$, preferably at a frequency of several hundred kHz, causes a current in the supply lines of the inductor L. Parameters with which this current is characterized are preferably a current mean value $I\_avg$, negative minima $I\_N$ and/or positive maxima $I\_P$ of the choke current $I\_L$, or peak values of the choke current $I\_L$. The choke current $I\_L$ through the inductor L also causes electrical voltages in the circuit arrangement. A parameter with which electrical voltages are characterized, preferably when a load or impedance is connected to the inductor L, is preferably a voltage $V\_c$ which is present between the first and the second potential P1, P2. These parameters $I\_avg$, $I\_N$, $I\_P$, $V\_c$ can be determined as a function of the duration TN1 between two zero crossings $N\_-$, $N\_+$ of the choke current $I\_L$, or a duration TNE1 between a zero crossing $N\_-$, $N\_+$ and a vertex $E\_-$, $E\_+$ of the choke current $I\_L$.

Furthermore, the circuit arrangement 200 preferably comprises a half bridge having a first switching element S1 and a second switching element S2. The first switching element S1 is connected on one side to a first potential P1, and is connected on the other side to a center tap M of the half bridge. The second switching element S2 is connected on one side to a second potential P2 and is connected on the other side to the center tap M of the half bridge. The inductor L is connected by a first connection to the center tap M and by a second connection to a third potential P3. An input voltage $V\_in$ is preferably present between the first potential P1 and the third potential P3. This input voltage $V\_in$ can alternatively also be present between the third potential and the second potential, and/or between the first potential P1 and the second potential P2. When an input voltage $V\_in$ is present, the alternating choke current $I\_L$ can be generated by the inductor L via suitable activation, preferably high-frequency activation, of the switching elements S1 and S2. The input voltage $V\_in$ is preferably a DC voltage or an AC voltage, wherein, compared to the frequency of the choke current $I\_L$, the frequency of the input voltage is very much lower; the frequency is preferably approximately 50 Hz, or is at least below 1 kHz. An AC voltage is preferably rectified by means of a diode rectifier to a DC voltage as the input voltage.

Figure 2:
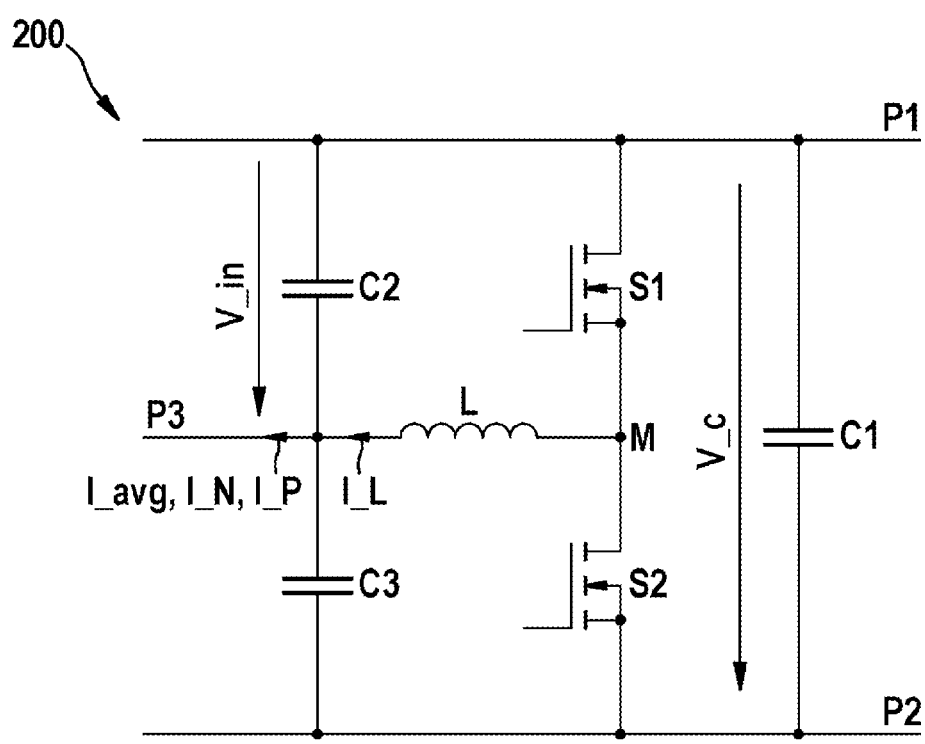
FIG. 2 is a schematic view of an expanded circuit arrangement.

FIG. 2 shows an expanded circuit arrangement 200 of the circuit arrangement 200 shown in FIG. 1. The circuit arrangement 200 according to FIG. 2 further comprises a first capacitor C1 which is arranged between the first potential P1 and the second potential P2, and is connected to each of them. The first capacitor C1 is preferably configured as an intermediate circuit capacitor, and preferably as an electrolytic capacitor. Preferably, a parameter which characterizes the voltage V_c at this first capacitor C1 can be determined as a function of a duration TNE1 and/or TNE2 between a zero crossing N_−, N_+ and a vertex E_−, E_+ of the choke current I_L (see also FIG. 3).

By way of example, for this circuit arrangement:
During TNE1:

$$\frac{\Delta I\_L}{\Delta t} = \frac{V\_in}{L} \quad (1)$$

$$\Delta I\_L = \frac{V_{in}}{L} \cdot \Delta t = \frac{V_{in}}{L} \cdot TNE1$$

During TNE2:

$$\frac{\Delta I\_L}{\Delta t} = \frac{V\_c - V\_in}{L} \quad (2)$$

$$V\_c = V\_in + \frac{\Delta I\_L \cdot L}{\Delta t} = V\_in + \frac{\Delta I\_L \cdot L}{TNE2}$$

(1) in (2) gives:

$$V\_c = V\_in + \frac{V\_in \cdot TNE1}{TNE2}$$

Furthermore, the circuit arrangement comprises a second and/or a third capacitor C2, C3. The second capacitor C2 is connected on one side to the first potential P1 and is connected on the other side to the third potential P3. The third capacitor C3 is connected on one side to the third potential P3 and is connected on the other side to the second potential P2. These capacitors C2, C3 serve to smooth the current profile of the currents and the voltage profile of the voltages in the circuit arrangement 200, preferably when the switching elements S1 and S2 are alternately closed and opened.

Figure 3:
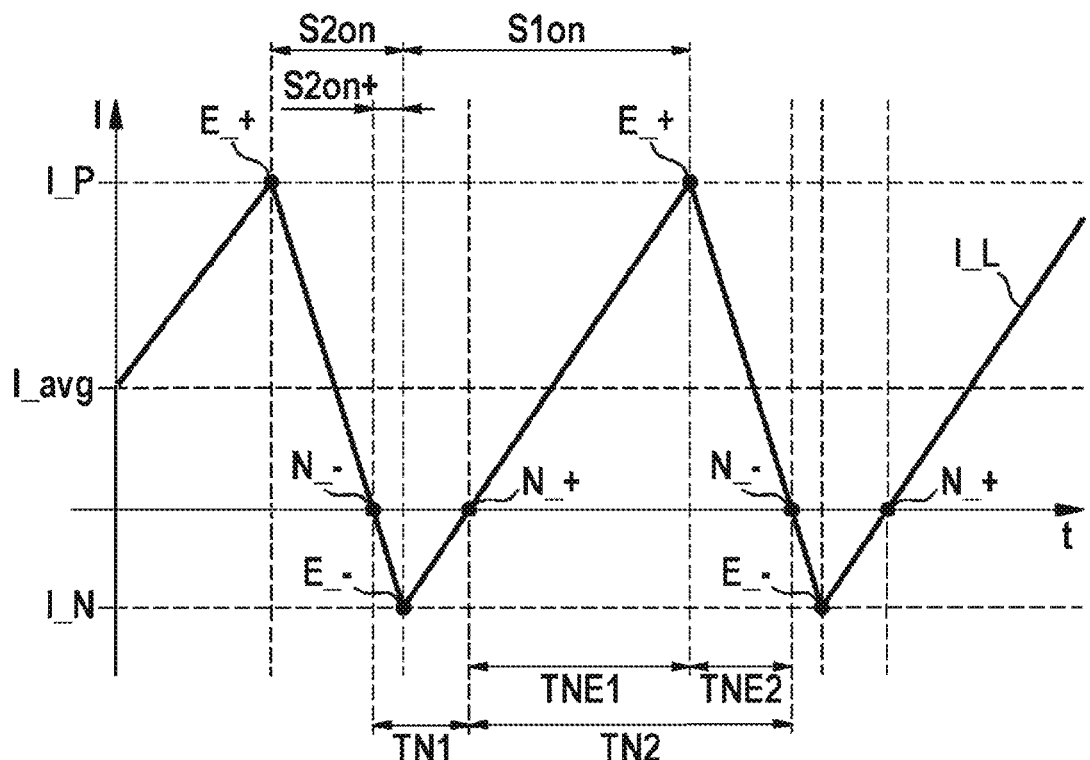
FIG. 3 shows a schematically illustrated current/time diagram with an alternating choke current.

FIG. 3 shows a schematically illustrated current/time diagram. The diagram shows the alternating choke current I_L through a choke, a primary or secondary winding of a transformer, or an inductor L. The illustrated profile of the choke current I_L is produced when the switching elements S1 and S2 are alternately closed and opened. By way of example, a duration S2on is shown, during which the second switching element S2 is switched on. The first switching element S1 is consequently open during this duration S2on. Furthermore, a duration S1on is shown, during which the first switching element S1 is closed, and consequently the second switching element S2 is open. This sequence of durations S2on and S1on repeats. The switching of the switching elements takes place between the durations S2on and Sion or S2on and Sion. The period duration T is the sum of the durations S2on and S ion. The ratio of the duration S1on to T is referred to as the duty cycle a1. The vertices E_−, E_+ and the negative and positive peak values, that is, the negative minimum I_N and the positive maximum I_P of the choke current I_L through the inductor L, are found at the switching points in time of the switching elements. On average, a current mean value I_avg is found for the high-frequency choke current I_L, which can be determined by means of graphic analysis of the regular, high-frequency choke current I_L in the diagram as a function of a duration TN1 between two zero crossings N_−, N_+ of the choke current I_L, preferably as a function of the input voltage V_in, the size of the inductor L, a duty cycle a1, and the duration TN1 between the zero crossings of the choke current I_L, and the period duration. If the detection of V_c is simpler than the detection of V_in, the formulas described below can also preferably be formulated to be functions of V_c.

Using the intercept theorem from elementary geometry, the geometric profile of the choke current shows that:

$$\frac{TN1}{-I\_N} = \frac{\frac{T}{2}}{I\_avg - I\_N}$$

And for the rising current, where di/dt=Vin/L during the duration S ion:

$$I\_P - I\_N = \frac{V\_in}{L} S1o$$

Consequently:

$$I_{avg} = \frac{V\_in}{2L} a_1 (T - 2 \cdot TN1)$$

Furthermore, the negative or positive peak value I_N, I_P of the choke current I_L through the inductor L can also be determined:

From the overall current ripple $$I\_P - I\_N = \frac{V\_in}{L} a_1 \cdot T$$

and $$I\_P = I_{avg} + \frac{I\_P - I\_N}{2}$$

and $$I\_N = I_{avg} + \frac{I\_P - I\_N}{2}$$

It is possible to determine, by inserting I_N and I_P:

$$I\_N = -\frac{V\_in}{L} a_1 \cdot TN1$$

$$I\_P = \frac{V\_in}{L} a_1 (T - TN1)$$

The formulas apply only to this circuit in the stationary, steady state; but similar formulas can also be derived for other topologies. The great advantage of the method is once again clear: the calculation of the currents and the control intervention in the circuit based thereon can preferably take place after the duration TN1 and can preferably also extend over the following periods. In the classical ZCD method, it was necessary to react to the signal of the zero crossing N_- directly. This preferably reduces the hardware requirements and offers sufficient time for a plausibility check of the measurement.

As such, a highly dynamic "sensor" for the mean value of the switched current is preferably realized by the method. The desired choke current can be implemented with a classical control structure. The determined current mean value I_avg of the choke current I_L is available after only one switching period, which makes it possible to make the controller acting thereon very high-performance. This makes it possible to stabilize the fast, switched current dynamics. Similarly, for other topologies, conclusions can be drawn about other states on the basis of the measured durations between the zero crossings or between the zero crossing and vertex, which leads to a reduction in the required sensors, and results in a direct cost saving.

Figure 4:
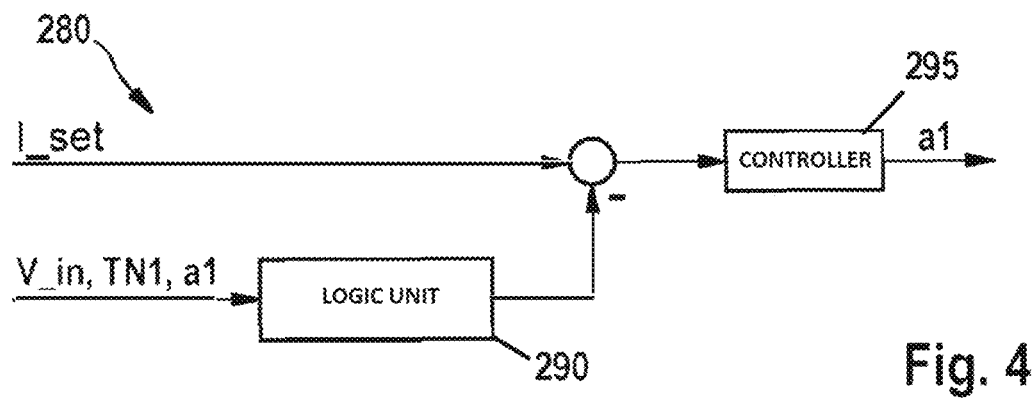
FIG. 4 shows a schematically illustrated current controller.

FIG. 4 shows a schematically illustrated current controller 280 for controlling a choke current I_L through an inductor L. In a logic unit 290, the parameter is determined as a function of the determined duration TN1, an input voltage V_in, and the duty cycle a1. The parameter determined according to the described method as a function of a duration TN1 between two zero crossings N_-, N_+ of the choke current I_L, which is preferably a current mean value I_avg, a negative peak value I_N and/or positive peak value I_P of the choke current I_L through the inductor L, is incorporated as a feedback variable of the control by the controller 295 of the current controller 280. To this end, the control deviation is fed to the controller 295 as the difference of a current setpoint value I_set and the feedback variable. A duty cycle a1 is preferably determined and output by the controller 295 as a controlled variable. In comparison with the classical ZCD method, no particular interface is thus required to the PWM modulator/mimer module; rather, only the duty cycle is specified. As such, the number of microcontrollers that can be used is significantly increased.

Figure 5:
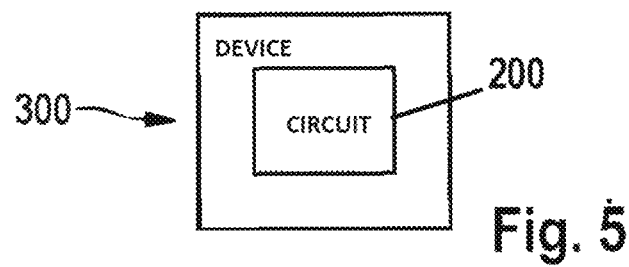
FIG. 5 shows a schematically illustrated device having an inductor, wherein the inductor is located in a circuit arrangement.

FIG. 5 shows a schematically illustrated device 300 having an inductor L, wherein the inductor is in a circuit arrangement 200. The device 300 is designed in particular as a DC/DC converter and/or as a charging device. The device 300 is configured to determine a parameter, preferably a parameter as a current mean value I_avg, a negative peak value I_N or a positive peak value I_P, according to the described method as a function of a duration TN1 between two zero crossings N_-, N_+ of the choke current I_L or of a first duration TNE1 and a second duration TNE2. The determined parameter I_avg, I_N, I_P, V_c is further used as a measured variable within the device 300 or transmitted to outside the device 300 via an interface.

Figure 6:
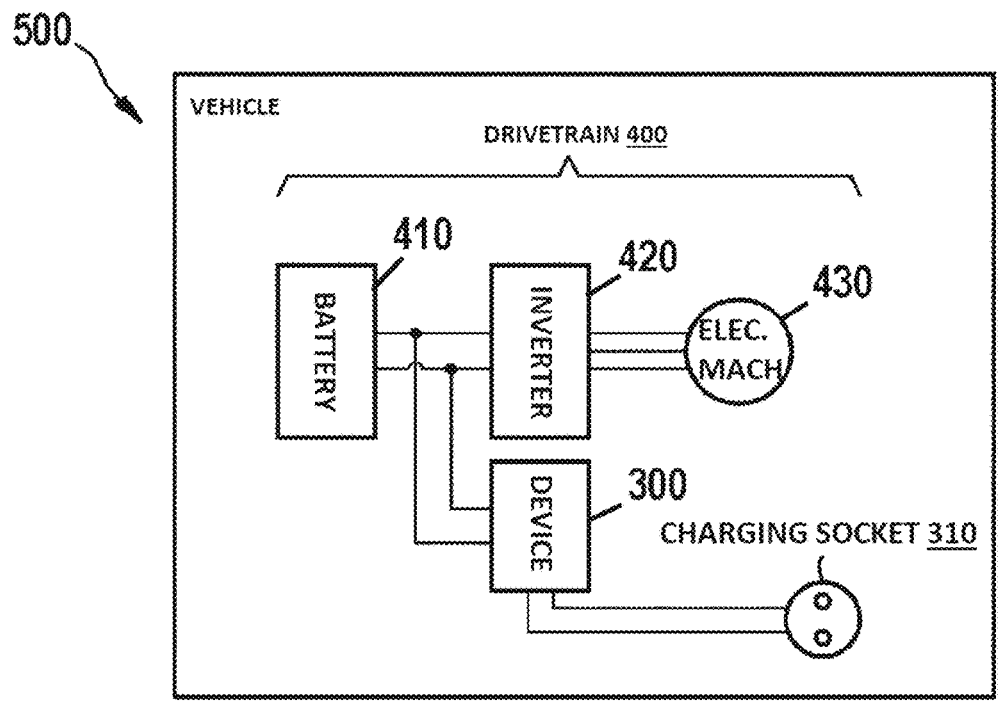
FIG. 6 shows a schematically illustrated vehicle having a drivetrain.

FIG. 6 shows a schematically illustrated vehicle 500, preferably a motor vehicle, ship or aircraft, having a drivetrain 400. In addition to the device 300, the drivetrain preferably comprises a battery 410, an inverter 420, an electric machine 430, and/or a charging socket 310. The battery 410 preferably supplies the inverter 420 with electrical energy. The inverter 420 preferably converts the electrical energy of the battery 410 into a polyphase AC voltage for supplying power to the electric machine 430. The device 300 is preferably designed as a DC/DC converter or charging device. Preferably, the DC/DC converter converts the electrical energy of the battery 410 into a low voltage, preferably for supplying power to an on-board electrical system of a vehicle 500, and/or vice versa. The charging device preferably converts an electrical energy supplied via the charging socket 310 into high-voltage energy, preferably for charging the electrical battery 410, or vice versa.

Figure 7:
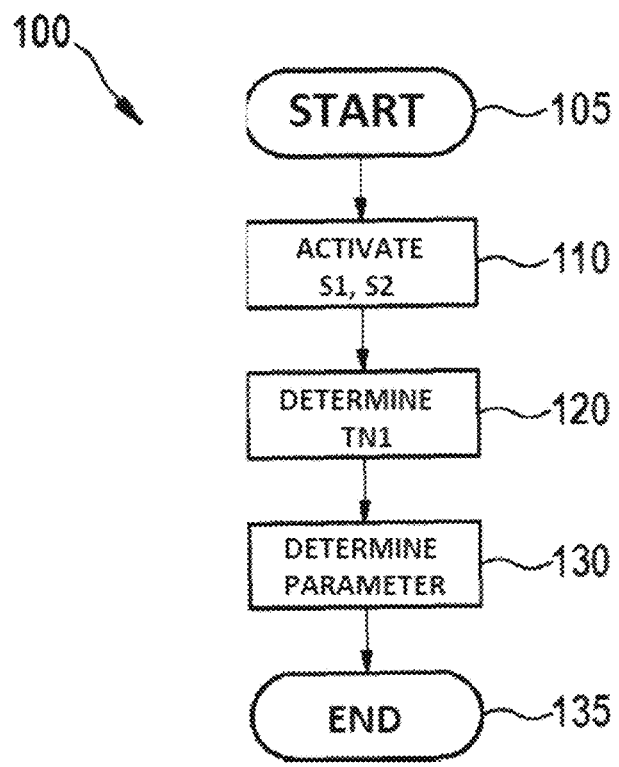
FIG. 7 shows a schematically illustrated flow chart for a method for determining a parameter, wherein the parameter characterizes a current or a voltage in a circuit arrangement.

FIG. 7 shows a schematically illustrated flow chart for a method 100 for determining a parameter I_avg, I_N, I_P, V_c, wherein the parameter I_avg, I_N, I_P, V_c characterizes a current or a voltage in a circuit arrangement 200. The method begins with step 105. In step 110, the first and the second switching element S1, S2 are preferably activated alternately, resulting in an alternating choke current I_L through the inductor L. In step 120, at least one duration TN1 between two zero crossings N_-, N_+ of the choke current I_L is determined, or a duration TNE1 between a zero crossing N_-, N_+ and a vertex E_-, E_+ of the choke current I_L is determined. In step 130, a parameter I_avg, I_N, I_P, V_c is determined as a function of the determined duration TN1, TNE1. The method is ended with step 135.

What is claimed is:

1. A method (100) for determining a parameter (I_avg, I_N, I_P, V_c), wherein the parameter (I_avg, I_N, I_P, V_c) characterizes a current or a voltage in a circuit arrangement (200),
   wherein the circuit arrangement (200) comprises an inductor (L),
   wherein an alternating choke current (I_L) flows through the inductor (L), the method comprising the steps of:
   determining (120) at least one duration (TN1) between two zero crossings (N_-, N_+) of the choke current (I_L); and
   determining (130) the parameter (I_avg, I_N, I_P, V_c) as a function of the determined duration (TN1),
   wherein the parameter (I_avg, I_N, I_P) characterizes a current through the inductor (L) in the circuit arrangement (200),
   wherein the circuit arrangement (200) comprises at least one half bridge having a first switching element (S1) and a second switching element (S2),
   wherein the first switching element (S1) is connected on one side to a first potential (P1) and is connected on the other side to a center tap (M) of the half bridge,
   wherein the second switching element (S2) is connected on one side to a second potential (P2) and is connected on the other side to the center tap (M) of the half bridge,
   wherein the inductor (L) is connected by a first connection to the center tap (M) and is connected by a second connection to a third potential (P3),
   wherein an input voltage (V_in) is present between the first potential (P1) and the third potential (P3),
   the method further comprising the steps of:
   alternately activating (110) the first and the second switching element (S1, S2) with a specifiable duty cycle (a1), resulting in the alternating choke current (I_L) through the inductor (L);
   determining (120) the duration (TN1, TN2) between the zero crossings of the choke current (I_L); and
   determining (130) the parameter (I_avg, I_N, I_P) as a function of the input voltage (V_in), the size of the inductor (L), the duty cycle (a1), and the duration (TN1, TN2) between the zero crossings of the choke current (I_L).

2. The method (100) according to claim 1, wherein the parameter (I_avg) to be determined is a current mean value of the choke current (I_L) through the inductor (L), and
   wherein the alternating activation (110) of the first and the second switching element (S1, S2) takes place at a specifiable frequency (1/T), and the current mean value is determined as a function of the period duration (T).

3. The method (100) according to claim 1, wherein the parameter (I_N, I_P) to be determined is a negative peak value (I_N) or a positive peak value (I_P) of the choke current (I_L) through the inductor (L).

4. The method (100) according to claim 1, wherein the determination of the duration (TN1, TN2) between the zero crossings comprises determining a first point in time of a first zero crossing (N_−) of the choke current (I_L) and determining a second point in time of a second zero crossing (N_+) of the choke current (I_L).

5. The method (100) according to claim 4, wherein the duration (TN1, TN2) between the points in time is determined by means of a counter.

6. A current controller (280) for controlling a choke current (I_L) through an inductor (L), having a logic unit (290) and a controller (295), wherein the logic unit (290) is configured to:
   carry out a method (100) according to claim 1,
   wherein the determined parameter (I_avg, I_N, I_P) is incorporated as a feedback variable of the control by the controller (295), and the duty cycle (a1) is output as a controlled variable,
   wherein the first and the second switching element (S1, S2) are activated as a function of the duty cycle (a1).

7. A device (300) having an inductor (L), the inductor (L) being arranged in a circuit arrangement (200), the device (300) being configured to carry out a method (100) according to claim 1,
   wherein the determined parameter (I_avg, I_N, I_P, V_c) is further used as a measured variable within the device (300), or is transmitted to outside the device (300) via an interface.

8. A drivetrain (400) comprising a device (300) according to claim 7.

9. A vehicle (500) comprising a drivetrain (400) according to claim 8.

10. A non-transitory, computer-readable medium comprising instructions which, when executed by a computer, cause the computer to
   determine a parameter (I_avg, I_N, I_P, V_c) that characterizes a current or a voltage in a circuit arrangement (200) that includes an inductor (L), wherein an alternating choke current (I_L) flows through the inductor (L), by
   determining (120) at least one duration (TN1) between two zero crossings (N_−, N_+) of the alternating choke current (I_L); and
   basing the determination (130) of the parameter (I_avg, I_N, I_P, V_c) on the determined duration (TN1);
   alternately activate (110) a first and a second switching element (S1, S2) with a specifiable duty cycle (a1), resulting in the alternating choke current (I_L) through the inductor (L);
   determine (120) the duration (TN1, TN2) between the zero crossings of the choke current (I_L); and
   determine (130) the parameter (I_avg, I_N, I_P) as a function of the input voltage (V_in), the size of the inductor (L), the duty cycle (a1), and the duration (TN1, TN2) between the zero crossings of the choke current (I_L),
   wherein the parameter (I_avg, I_N, I_P) characterizes a current through the inductor (L) in the circuit arrangement (200),
   wherein the circuit arrangement (200) comprises at least one half bridge having a first switching element (S1) and a second switching element (S2),
   wherein the first switching element (S1) is connected on one side to a first potential (P1) and is connected on the other side to a center tap (M) of the half bridge,
   wherein the second switching element (S2) is connected on one side to a second potential (P2) and is connected on the other side to the center tap (M) of the half bridge,
   wherein the inductor (L) is connected by a first connection to the center tap (M) and is connected by a second connection to a third potential (P3), and
   wherein an input voltage (V_in) is present between the first potential (P1) and the third potential (P3).

* * * * *